United States Patent [19]
Pick

[11] Patent Number: 5,829,141
[45] Date of Patent: Nov. 3, 1998

[54] DEVICE FOR CUTTING INSULATION

[75] Inventor: Steve J. Pick, Polson, Mont.

[73] Assignee: Technical and Management Services Corporation, Calverton, Md.

[21] Appl. No.: 723,122

[22] Filed: Sep. 30, 1996

[51] Int. Cl.[6] .............................. B21F 13/00; H02G 1/12
[52] U.S. Cl. ............................ 30/90.7; 30/90.8; 81/9.4
[58] Field of Search .................... 30/90.4, 90.6, 30/90.7, 90.8; 81/9.42, 9.4; 82/46, 47

[56] References Cited

U.S. PATENT DOCUMENTS

| | | |
|---|---|---|
| 843,353 | 2/1907 | McKenna . |
| 1,866,095 | 7/1932 | Foley ........................ 30/90.8 |
| 2,370,733 | 3/1945 | Jones . |
| 2,437,514 | 3/1948 | Givens ...................... 30/90.8 |
| 2,778,105 | 1/1957 | Carta ........................ 30/90.7 |
| 3,091,031 | 5/1963 | Grant ........................ 30/90.8 |
| 4,179,956 | 12/1979 | Gooley ...................... 30/90.8 |
| 4,426,778 | 1/1984 | Christie .................... 30/90.1 |
| 4,447,949 | 5/1984 | Kane ........................ 30/90.6 |
| 4,953,428 | 9/1990 | Commes ...................... 30/90.7 |
| 4,955,137 | 9/1990 | Matthews .................... 30/90.1 |
| 5,435,029 | 7/1995 | Carlson, Jr. et al. . |

Primary Examiner—Hwei-Siu Payer
Attorney, Agent, or Firm—Dickstein Shapiro Morin & Oshinsky LLP

[57] ABSTRACT

A tool is provided for cutting an outer layer of insulation from an elongated cable or the like. The tool has a cable support or back stop, a knife, a rotatable and adjustable knife holder with a shoulder for contacting and riding over the insulation, and a spring for biasing the holder toward the support. The knife can be positioned to make circumferential and lengthwise cuts through the insulation. An opening may be provided to accommodate a measuring device. A handle may be provided for selectively moving and rotating the knife holder. The handle may be guided by slots in a housing. The knife may be easily positioned in the knife holder and/or replaced.

10 Claims, 6 Drawing Sheets

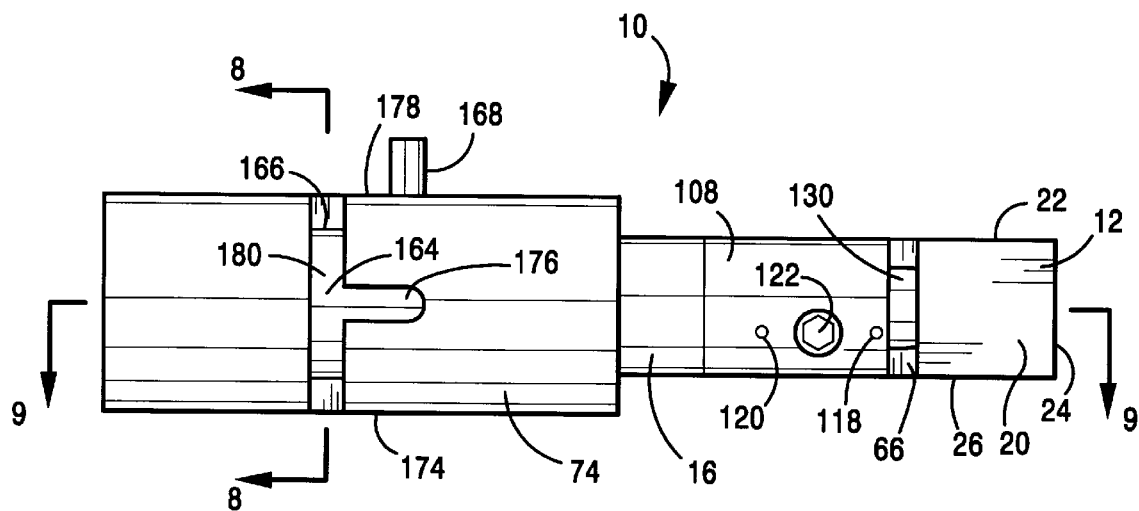
FIG. 3
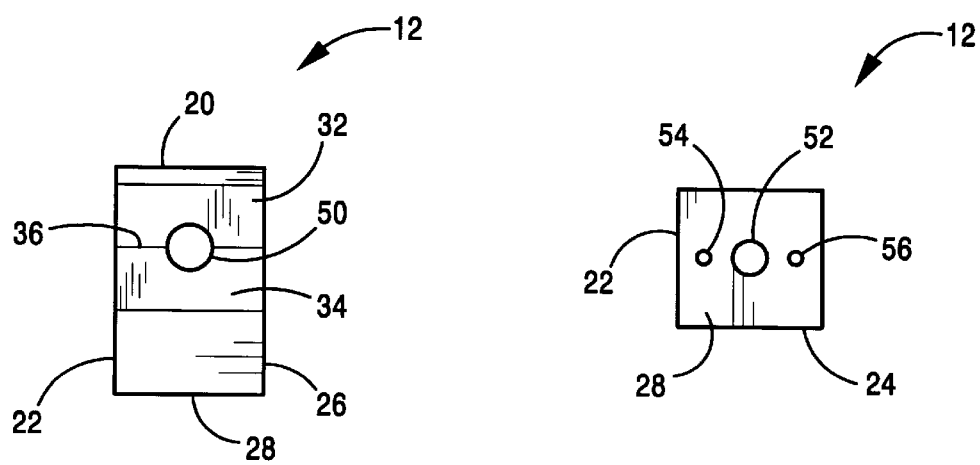
FIG. 4
FIG. 5

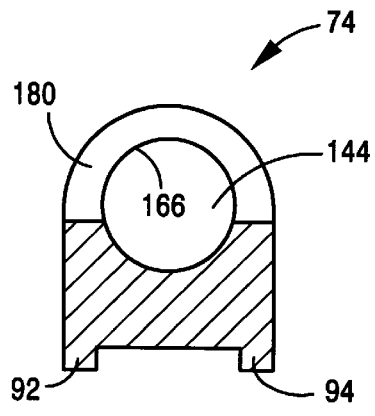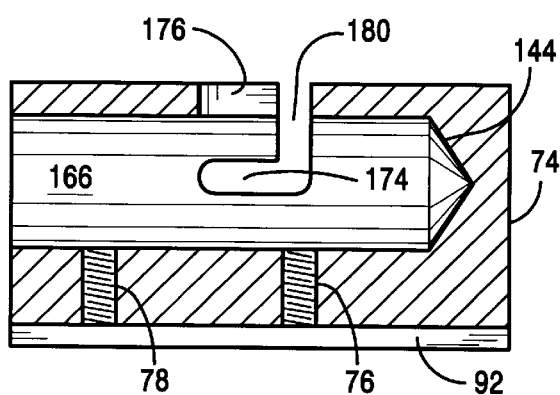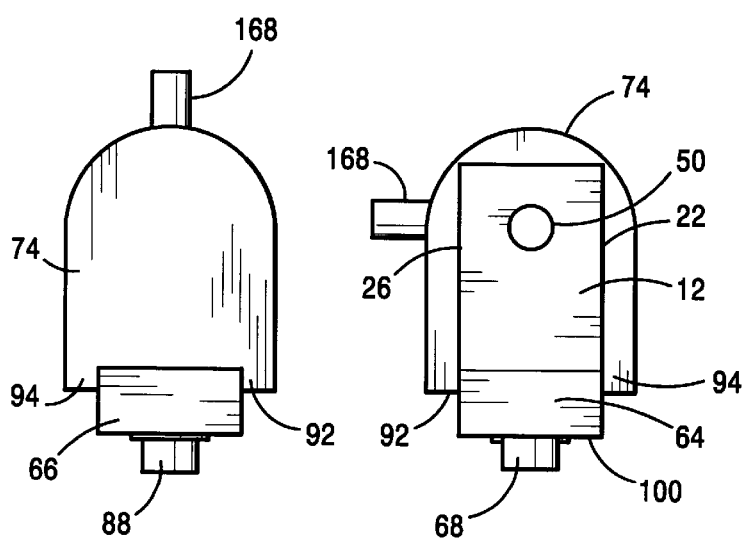
FIG. 8    FIG. 9
FIG. 10    FIG. 11    FIG. 12

DEVICE FOR CUTTING INSULATION

BACKGROUND OF THE INVENTION

The present invention relates generally to cutting tools. More particularly, the present invention relates to a device for stripping an outer layer of insulation from an elongated conductor, such as an insulated electrical wire or cable. The invention also relates to a tool for making a circumferential and/or lengthwise cut through insulation without damaging an inner layer, such as a braided wire layer underneath the insulation.

It is known in the electronics industry to employ fine wire that is first insulated, then encased in wire braiding and then shielded within plastic insulation. Such cables sometimes have helical external contours. That is, the surface of the outer layer of insulation is not always cylindrical. Sometimes the exterior surface of the insulation follows the form of the interior wires which may be spirally wound around each other.

Typically, it is necessary to strip the ends of such cables to prepare them for use. When this is done with a blade or knife edge, it is difficult to strip the outer layer of insulation in a repeatable and consistent manner without waste or spoilage. The inner wire braiding immediately inside the plastic insulation can be inadvertently damaged by the knife blade extending radially too far into the cable. In some products, even slight damage to the wire braiding makes it necessary to reject the entire cable.

Prior art devices for cutting insulation and other wire and cable components are shown in U.S. Pat. Nos. 5,435,029 (Carlson), 4,955,137 (Mathews), 4,426,778 (Christie), 2,370,733 (Jones) and 843,353 (McKenna).

SUMMARY OF THE INVENTION

The present invention relates to a tool for stripping an outer layer of insulation from an elongated cable or the like. The tool includes: a cable support for rotatably and/or slidably supporting the cable; a knife for cutting the outer insulation; a rotatable knife holder with a shoulder for contacting and riding over the insulation; and a spring for biasing the holder toward the support. In a preferred embodiment of the invention, the knife makes a circumferential cut through the insulation in a first position, and a lengthwise cut through the insulation in a second position.

In one aspect of the invention, an opening extends through the cable support to receive a measuring device. The measuring device may be used to adjust the depth to which the knife cuts into the cable. Thus, the knife may be adjusted to cut entirely through the insulation, even when the insulation is not cylindrical, without damaging an underlying braided layer.

In another aspect of the invention, a handle is provided for moving and rotating the knife holder.

In another aspect of the invention, the tool has a housing for enclosing the spring and for slidably receiving a cylindrical portion of the knife holder. In a preferred embodiment of the invention, the housing has at least two, and preferably three, axially aligned slots and a transverse connecting slot, for guiding and constraining the handle.

Further, in a preferred embodiment of the invention, a base member is used to adjustably connect the cable support to the housing.

In another aspect of the invention, the knife holder has a cover for releasably holding or clamping the knife, and the knife can be easily positioned in the knife holder and/or replaced.

In another aspect of the invention, one or more pins are used together with the spring to bias the knife toward the cable support. The spring and pins arrangement may also be used to press the knife into the cable to effect the desired circumferential and/or longitudinal cut through the cable insulation.

Thus, an object of the invention is to provide a device for cutting and stripping an outer layer of insulation without damaging an underlying layer of braided wire.

Another object of the invention is to provide a tool that can be used quickly and reliably to strip insulation from the end of a wire cable.

Another object of the invention is to provide a tool that can be used with a wide range of wire and cable sizes and types. In one aspect of the invention, the same tool can be used for very fine wires as well as for cable products up to one inch in diameter.

Another object of the invention is provide a tool that can cut circumferentially around a cable and also lengthwise in the direction of the cable axis.

Another object of the invention is to provide a tool that accommodates interchangeable blades.

Another object of the invention is to provide a tool that can use commercially available blades.

Another object of the invention is to provide a cutting tool with means for measuring the position of a knife, so as to obtain and maintain an exact cut depth.

Other objects and advantages of the invention will become apparent from the following detailed description and drawings illustrating preferred embodiments of the invention.

BRIEF DESCRIPTION OF THE DRAWINGS

FIG. 3 is a top view of the tool of FIG. 1, with the handle moved to a lengthwise cutting position.

FIG. 4 is a rear view of the cable support for the tool of FIG. 1.

FIG. 5 is a bottom view of the cable support.

FIG. 8 is a cross-sectional view of the housing, taken along the line 8—8 of FIG. 3.

FIG. 9 is a cross-sectional view of the housing, taken along the line 9—9 of FIG. 3.

FIG. 10 is a rear view of the tool of FIG. 1, showing the base and the housing.

FIG. 11 is a front view of the tool of FIG. 1.

FIG. 12 is a cross-sectional view of the housing, taken along the line 12—12 of FIG. 2.

DETAILED DESCRIPTION OF PREFERRED EMBODIMENTS

Figure 1:
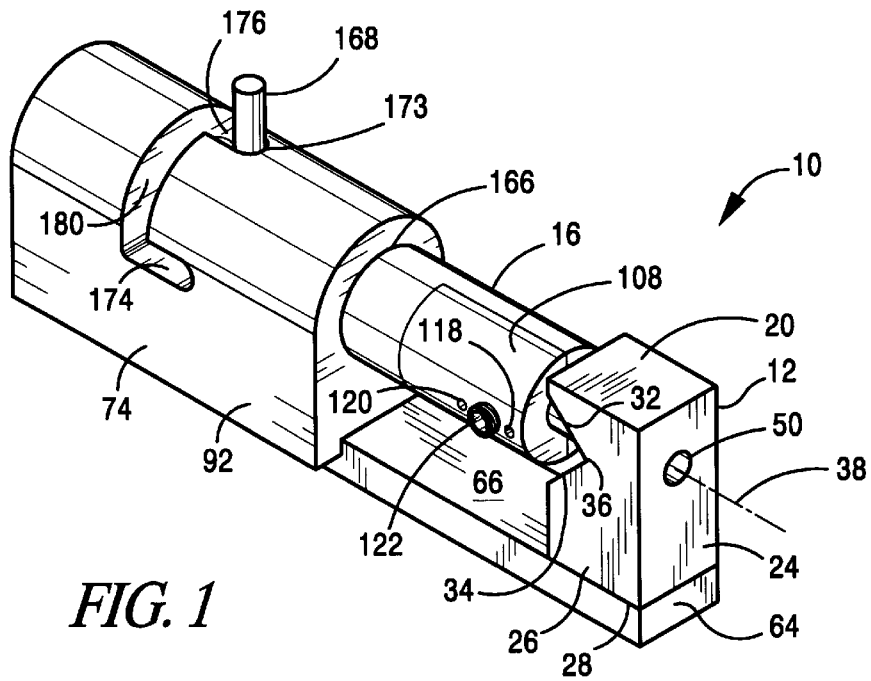
FIG. 1 is a perspective view of a cutting tool constructed in accordance with the present invention.

Referring now to the drawings, where like elements are designated by like reference numerals, there is shown in FIG. 1 a wire stripper tool 10 constructed in accordance with a preferred embodiment of the present invention. The tool 10 has a cable support 12 for rotatably and slidably supporting an electrical cable. (The cable is not illustrated in FIG. 1.) A knife 14 (FIG. 2) is provided for cutting through a layer of insulation or other material on the outside of the cable. A movable knife holder 16 is provided for holding the knife 14. A spring 18 is provided for biasing the knife holder 16 toward the support 12 (that is, from left to right as viewed in FIGS. 2 and 3).

The cable support 12 may be in the form of a rectangular block of metal or rigid plastic. The illustrated support 12 has generally rectangular, planar surfaces 20, 22, 24, 26, 28 (FIGS. 3 and 4) and a concave surface for holding the cable in position to be cut by the knife 14. In the illustrated embodiment, the concave cable support surface is formed of two substantially perpendicular, planar surfaces 32, 34 that meet at a corner line 36.

The corner line 36 is aligned with the axis 38 (FIG. 2) of the knife holder 16. The tip 40 of the knife 14 is also aligned substantially with the knife holder axis 38. The insulated cable (not illustrated in FIGS. 2 and 3), when located between the support 12 and the knife holder 16, is biased securely toward the corner line 36 and does not tend to move above or below the knife holder axis 38. The V-shaped concave surface 32, 34 acts as a fixed back stop for the cable.

In a preferred embodiment of the invention, an opening 50 (FIG. 1) extends through the cable support 12 from the front planar surface 24 to the concave surface 32, 34. The opening 50 may be aligned with the knife holder axis 38. The opening 50 provides access for a measuring tool (not illustrated) as described in more detail below.

Figure 6:
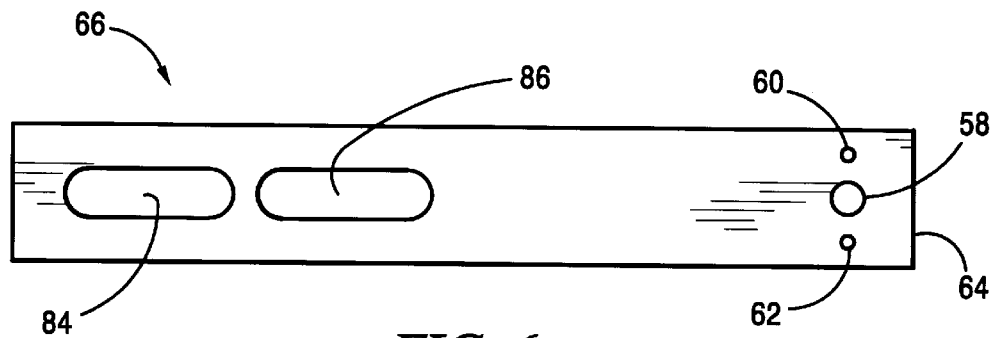
FIG. 6 is a top view of the base for the tool of FIG. 1.

The bottom surface 28 of the support 12 has a central threaded opening 52 (FIG. 5) located between upper pin openings 54, 56. The three openings 52, 54, 56 are aligned with corresponding openings 58, 60, 62 (FIG. 6) extending through the front end 64 of a base member 66. A threaded screw 68 (FIG. 7) passes through the central opening 58 of the base member 66 and is threaded into the support opening 52. The screw 68 connects the support 12 to the base member 66. The central opening 58 of the base member 66 is not threaded. Pins 70, 72 are press fit into the other openings 54, 56, 60, 62 to align the support 12 with respect to the base member 66.

Figure 7:
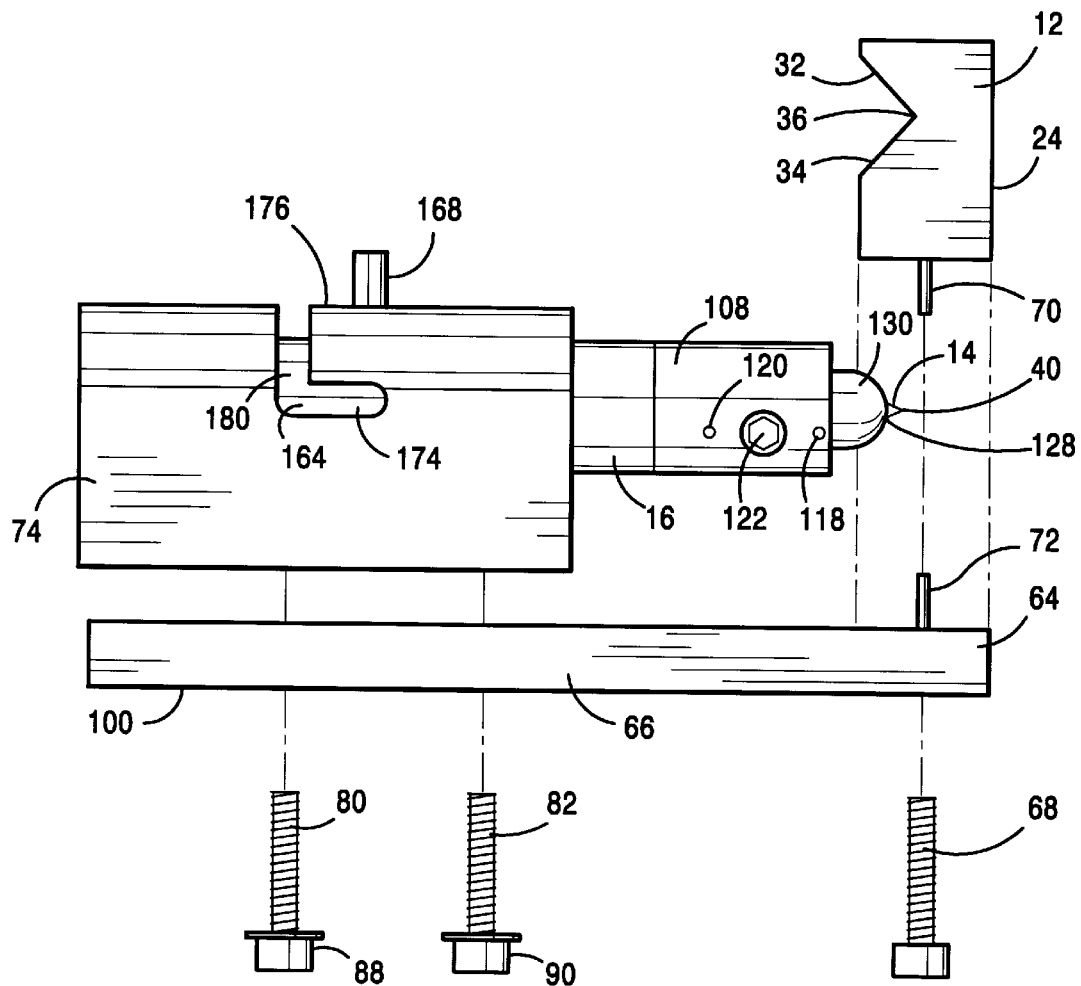
FIG. 7 is an exploded side view of the tool of FIG. 1.

The base member 66 may be a solid block of metal or rigid plastic. The purpose of the base member 66 is to adjustably connect the support 12 to a housing 74. The housing 74 provides movable support for the knife holder 16. Thus, the housing 74 has first and second threaded openings 76, 78 (FIG. 9) for receiving threaded screws 80, 82 (FIG. 7). The screws 80, 82 extend through slots 84, 86 (FIG. 6) in the base member 66.

When the screws 80, 82 are loosened, the housing 74 can be moved axially (in the direction of the axis 38) with respect to the base member 66. The loosened screws 80, 82 can slide through the slots 84, 86 to adjust the axial position of the housing 74. With the illustrated arrangement, the tool 10 may be adjusted to operate on different sizes and types of cable, wire and the like.

To handle even larger wires or cables, the tool 10 may be provided with an extra large cable support (not illustrated) and a long base member (not illustrated). The extra large cable support may be larger but otherwise configured the same as the illustrated cable support 12. The long base member may be curved or angled downwardly to locate the corner line 36 and opening 50 of the extra large cable support coincident with the knife holder axis 38. The long base member may be otherwise constructed the same as the illustrated base member 66.

When the screws 80, 82 are tightened, such that the screw heads 88, 90 are tightened against the lower surface 100 of the base member 66, the housing 74 is fixed in the desired position with respect to the base member 66 and the cable support 12. Since there are at least two screws 80, 82 forming the connection, the housing 74 is prevented from rotating about a vertical axis with respect to the base member 66. The stability of the connection between the housing 74 and the base member 66 is enhanced by shoulders 92, 94 extending the full length of the housing 74. The shoulders 92, 94 overlap the base member 66 on both sides. In sum, the adjustable arrangement of the illustrated cutting tool 10 maintains close axial alignment of the housing 74.

Figure 13:
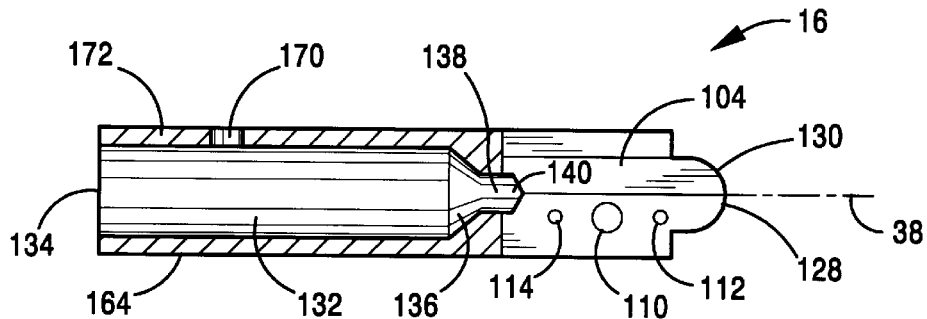
FIG. 13 is a cross-sectional view of the knife holder for the tool of FIG. 1, taken along the line 9—9 of FIG. 3, with the knife and clamping piece removed.
Figure 14:
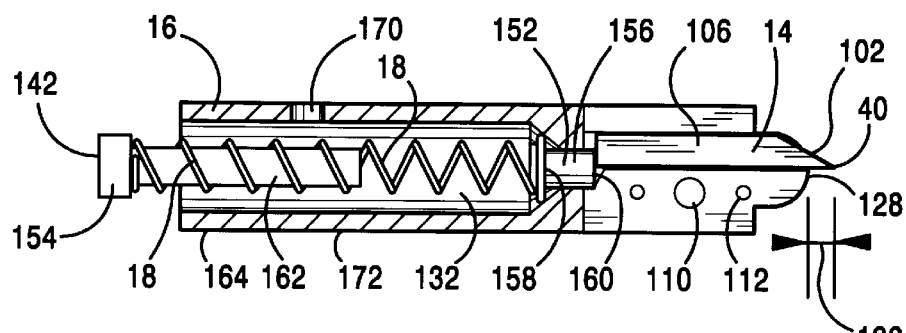
FIG. 14 is a cross-sectional view like FIG. 13 of the knife holder, and with the knife, spring and associated pins in place.
Figure 15:
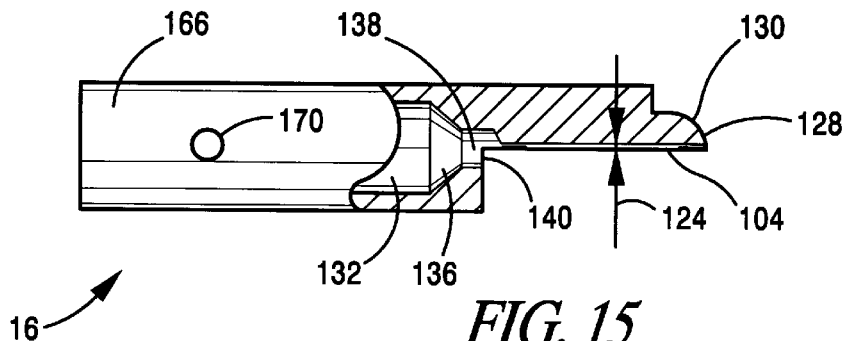
FIG. 15 is a partial cross-sectional side view of the knife holder.
Figures 16, 17, 18:
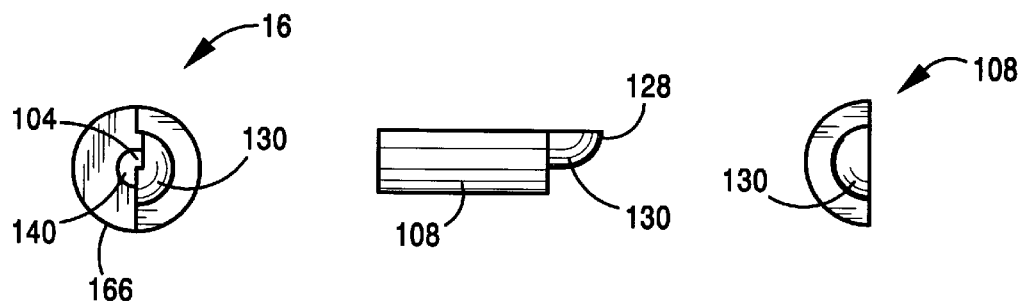
FIG. 16 is a front view of the knife holder.
FIG. 17 is a side view of the cover or clamping piece for the knife holder.
FIG. 18 is a front view of the clamping piece.

Turning now to FIG. 14, the knife 14 may be an elongated flat plate of metal with an angled cutting surface 102 forming the sharp tip 40. The knife holder 16 has a rectangular shaped recess 104 (FIGS. 13, 15 and 16) for receiving the plate-shaped body 106 of the knife 14. The recess 104 is covered by a clamping piece 108 (FIGS. 17 and 18). The clamping piece 108 is used to hold the knife 14 in place within the knife holder 16.

Figure 2:
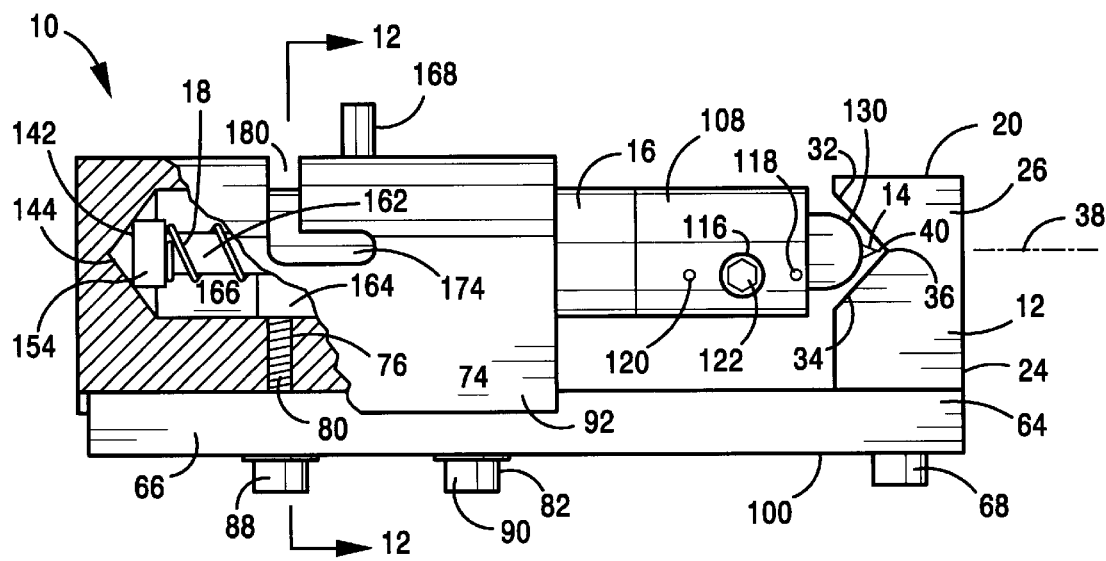
FIG. 2 is a side view of the tool of FIG. 1.

The knife holder 16 has a central threaded opening 110 (FIGS. 13 and 14) located between press fit openings 112, 114. As shown in FIG. 2, the clamping piece 108 has corresponding openings 116, 118, 120. The central openings 110, 116 receive a threaded screw 122. Pins (not illustrated) are press fit into the other openings 112, 114, 118, 120 to maintain the alignment of the clamping piece 108 with respect to the knife holder 16.

The depth 124 (FIG. 15) of the recess 104 is slightly less than the thickness of the knife body 106. Consequently, when the clamping screw 122 is tightened and the head of the screw 122 is pressed against the outside of the clamping piece 108, the knife 14 is fixed in place with respect to the knife holder 16. The central opening 116 of the clamping piece 108 is not threaded in the illustrated embodiment.

Thus, the axial position of the knife 14 can be adjusted when the clamping screw 122 is loosened. The distance 126 (FIG. 14) by which the knife tip 40 extends past the front surface 128 of the knife holder 16 can be measured by a tool extending through the support opening 50. As explained in more detail below, the distance 126 by which the knife 14 extends beyond the knife holder 16 may be set equal to the thickness of the insulation to be stripped from the cable.

The knife holder 16 and the clamping member 108 together form a hemispherical surface or shoulder 130. The front portion 128 of the knife holder 16 constitutes the front 128 of the shoulder 130. As explained in more detail below, the shoulder 130 rides over the cable insulation to ensure that the knife 14 remains at all times in position to cut entirely through the insulation without cutting into an underlying braid or other cable layer.

The knife holder 16 may be formed of metal or rigid plastic. As shown in FIG. 13, the interior of the knife holder 16 is hollow. That is, the knife holder 16 has a large diameter cylindrical chamber 132, a frusto-conical chamber 136, and a small diameter cylindrical chamber 138. At the rear of the knife holder 16, the main chamber 132 has an open end 134. A smaller opening 140 faces the front of the knife holder 16.

A front pin 152 (FIG. 14) is located within the small diameter chamber 138. The front pin 152 has a small diameter portion 156 and a large diameter portion 158. The diameter of the larger portion 158 is too big to pass through the small diameter chamber 138. The spring 18 is located within the main chamber 132. The spring 18 extends rearwardly out of the knife holder 16 through the rear open end 134. A rear pin 154 extends part way into the coils of the spring 18. As shown in the drawings, the rear pin 154 also extends partially into the main chamber 132.

The head 142 of the rear pin 154 presses against and is centered by a machined conical rear surface 144 (FIG. 2) in the housing 74. Consequently, the spring 18 is compressed axially and presses the front pin 152 toward the cable support 12 (that is, from left to right as viewed in FIG. 14). The front end 160 of the pin 152 contacts the knife 14 and resiliently biases the knife 14 toward the front of the knife holder 16 when the clamping screw 122 is loosened. In addition, the large diameter portion 158 of the front pin 152 is captured between the spring 18 and the surface of the frusto-conical chamber 136 to bias the knife holder 16 toward the cable support 12.

The rear pin 154 has a long front portion 162 of a relatively small diameter received within the spring 18. The long front portion 162 is mostly located within the main chamber 132 of the knife holder 16. The inner surface of the main chamber 132 and the outer surface of the pin portion 162 cooperate to prevent the compression spring 18 from becoming excessively bowed or twisted. In other words, the spring 18 is coaxially sandwiched between the rear pin 154 and the inner cylindrical surface of the main chamber 132.

The knife holder 16 has a cylindrical exterior surface 164 that slides into and is axially guided by a cylindrical interior surface 166 (FIG. 8) within the housing 74. Thus, the knife holder 16 and housing 74 operate like a piston and cylinder arrangement. The knife holder 16 is biased out of the housing 74 (toward the cable support 12) by the spring 18.

Referring now again to FIG. 1, a handle 168 is provided for moving and controlling the position of the knife holder 16. The illustrated handle 168 is a rod formed of metal or rigid plastic. The handle 168 is sized to be grasped and controlled by an operator's forefinger.

The handle 168 may be press fit into an opening 170 (FIGS. 14 and 15) formed through the cylindrical wall 172 of the knife holder 16. The handle 168 fits into an arrangement of three axially aligned slots 174, 176, 178 and a single connecting transverse slot 180. In the illustrated embodiment, the aligned slots 174, 176, 178 are all the same length and are each perpendicular to the transverse slot 180. The transverse slot 180 extends one hundred eighty degrees around the axis 38 of the knife holder 16.

Figure 19:
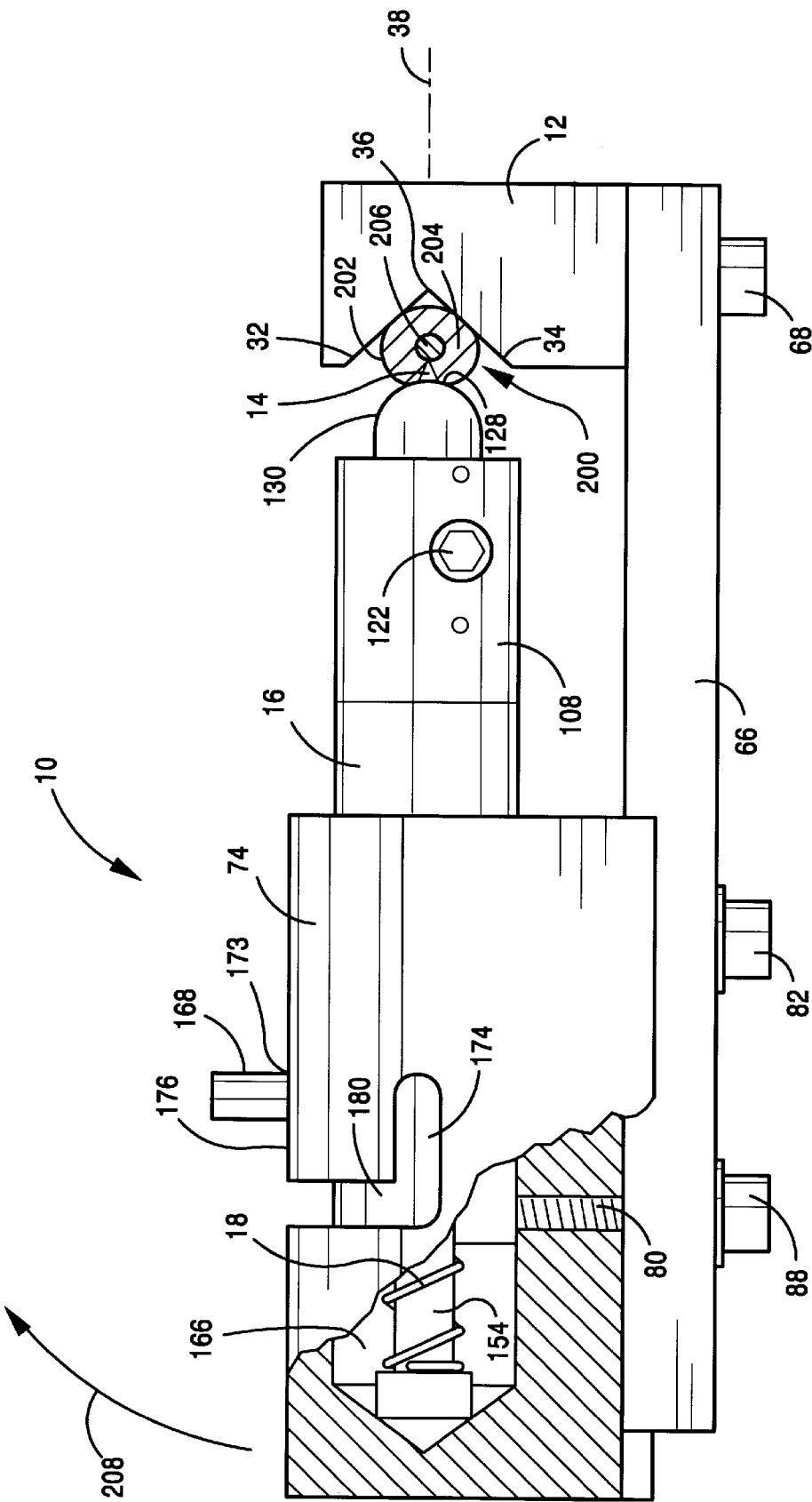
FIG. 19 is a side view, like FIG. 2, but with the tool shown in position to cut circumferentially through insulation on a cable.

In operation, the handle 168 is pulled rearwardly into the transverse slot 180, against the bias of the spring 18, to move the knife tip 40 away from the cable support surface 32, 34. An insulated electrical cable, wire or the like 200 (FIG. 19) is then inserted into the space between the knife 14 and the cable support 12. The exterior surface 202 of the cable 200 may be non-cylindrical as shown in cross section in FIG. 19.

In the inserted position, the cable 200 is essentially perpendicular to the knife holder axis 38, and the cable 200 is essentially parallel to the corner line 36 of the cable support 12. The handle 168 is then released. When the handle 168 is released, the compression spring 18 causes the knife holder 16 to move forward to the position shown in FIG. 19, with the handle 168 almost reaching the front edge 173 of the middle axial slot 176.

When the cable 200 is in the illustrated cutting position, the handle 168 will not quite reach the front edge 173 of the middle slot 176. Consequently, during a cutting operation, the knife holder 16 floats axially, following the contour of the exterior surface 202 of the insulation 204 on the cable 200.

With the handle 168 released into the middle axial slot 176, the knife 14 cuts into the cable insulation 204 until the front portion 128 of the shoulder 130 rests on the outer insulation surface 202. In this position, the cable 200 is pressed into contact against the perpendicular walls 32, 34, forming a secure three point holding arrangement. The illustrated holding arrangement prevents lateral movement of the cable 200 while permitting sliding rotation and axial movement of the cable 200, to make circumferential and longitudinal cuts, respectively.

To form a circumferential cut, the cutting tool 10 is rotated around the cable 200 in the direction of the arrow 208. The cutting tool 10 may be rotated around the cable 200 through at least three hundred sixty degrees such that the knife 14 makes a clean circumferential cut through the insulation 204. As the tool 10 is rotated, the shoulder 130 rides over the insulation surface 202 to ensure that the insulation 204 is cut completely through without cutting into an underlying layer 206 of wire braid or the like.

After the circumferential cut is formed, the handle 168 is pulled back to the transverse slot 180. Then, if the distance between the circumferential cut and the end of the cable 200 is relatively short, the cable 200 may be removed from the tool 10 and the cut portion of insulation 204 may be manually slid off the end of the cable 200.

In an alternative procedure, the cable 200 may remain in the tool 10 while the handle 168 is moved to the axial slot 178 facing the end of the cable 200. The handle 168 is then released again, such that the spring 18 causes the knife 14 to penetrate the insulation 204.

The cable 200 is then pulled through the tool 10 to form a longitudinal cut that starts at the circumferential cut and extends in the direction of the cable 200. The longitudinal cut may extend to the end of the cable 200. As the longitudinal cut is formed, the shoulder 130 rides over the insulation 204 to ensure that the insulation 204 is cut clean through without damaging the underlying layer 206. During the cutting operation, the handle 168 preferably does not reach the front end of the second axial slot 178. This way, the knife holder 16 is permitted to float slightly in the axial direction while the cable 200 is pulled through the tool 10.

An advantageous feature of the illustrated tool 10 is that the second and third axial slots 178, 174 can be used to make longitudinal cuts in opposite directions. The exposed portion of the knife 14 is small so that the tool 10 can be operated more safely. The small exposed portion of the knife 14 may be difficult to see. (The exposed length of the knife 14 and the corresponding thickness of the insulation 204 are exaggerated for clarity of illustration in the drawings.) Thus, an advantage of the illustrated tool 10 is that the handle 168 may be used as a visual indicator, making it easy to know which way to turn the handle 168 to place the knife edge 102 in the desired position for cutting. In the illustrated embodiment, the handle 168 and the knife edge 102 always face in the same direction.

To adjust the depth of the cut made by the knife 14, the central clamping screw 122 is loosened to permit the knife 14 to be moved axially with respect to the shoulder 130. A measuring tool, such as a known depth micrometer (not illustrated), may then be located within the support opening 50 to measure the short distance 126 (FIG. 14) by which the knife tip 40 extends beyond the front part 128 of the shoulder 130. The set distance 126 determines the depth of the cut and should be equal to the thickness of the insulation 204 desired to be cut.

The above description and drawings are only illustrative of preferred embodiments which can achieve and provide the objects, features and advantages of the present invention. It is not intended that the invention be limited to the embodiments shown and described in detail herein. Modifications coming within the spirit and scope of the following claims are to be considered part of the invention.

What is claimed as new and desired to be protected by Letters Patent of the United States is:

1. A tool for cutting an outer layer of material, said cutting tool comprising:

a support for rotatable and slidably supporting the layer of material;

a knife for cutting the layer of material;

a knife holder for holding said knife, said knife holder having a shoulder for contacting the layer of material, said knife holder being rotatable to selectively position said knife in at least first and second positions, with said knife being arranged to cut the layer of material circumferentially in said first position, and wherein said knife is arranged to cut the layer of material lengthwise in said second position; and a spring for biasing said knife holder toward said support in a first direction aligned with the axis of rotation of said knife holder; and wherein said support defines an opening for receiving a measuring device.

2. The cutting tool of claim 1, further comprising a handle for moving said knife holder in a second direction and for rotating said knife holder about said axis of rotation, said second direction being opposite said first direction.

3. The cutting tool of claim 2, further comprising a housing for enclosing said spring and for slidably receiving a portion of said knife holder, said housing defining slots for guiding said handle.

4. The cutting tool of claim 3, wherein said slots include first and second axially aligned slots for permitting said knife to move in said first direction toward said first and second positions, and a third axially aligned slot for permitting said knife holder to move in said first direction to a third position, said first, second and third axially aligned slots being angularly spaced apart from each other about said axis of rotation of said knife holder, and a transverse slot for moving said handle from said first axially aligned slot to said second and third axially aligned slots.

5. The cutting tool of claim 3, further comprising a base member for adjustably connecting said support to said housing.

6. The cutting tool of claim 5, wherein said knife holder includes a cover for releasably clamping said knife.

7. A method of handling a cable having a braided layer and an outer layer of insulation, said method comprising the steps of:

positioning said cable between a support and a knife;

subsequently, using said knife to cut said insulation circumferentially and lengthwise;

using a knife holder to rotate said knife from a first position to a second position;

resiliently biasing said knife holder toward said support in a first direction aligned with the axis of rotation of said knife holder;

subsequently, removing a cut portion of said insulation from an end of said cable; and measuring said knife, and wherein said measuring step occurs while said knife holder is resiliently biased toward said support in said first direction.

8. The method of claim 7, further comprising the step of providing a housing for at least partially enclosing said knife holder, wherein said housing defines at least first, second and third axially aligned slots for permitting said knife to move in said first direction, and a transverse slot for moving a handle from said first axially aligned slot to said second and third axially aligned slots.

9. The method of claim 8, further comprising the step of replacing said knife with a second knife, and wherein said replacing step occurs while said knife holder is resiliently biased toward said support in said first direction.

10. A method of handling a cable having (a) a braided layer, (b) an outer non-cylindrical layer of insulation, (c) wires that are spirally wound around each other, and (d) a helical external contour, said method comprising the steps of:

positioning said cable between a support and a knife;

subsequently, using said knife to cut said non-cylindrical layer of insulation circumferentially and lengthwise, without cutting said braided layer;

using a knife holder to rotate said knife from a first position to a second position;

using a spring to resiliently bias said knife holder toward said support in a first direction aligned with the axis of rotation of said knife holder;

subsequently, removing a cut portion of said non-cylindrical layer of insulation from an end of said cable; and using a hemispherical shoulder to slidably support said knife within said non-cylindrical layer of insulation.

* * * * *